Figure 1:
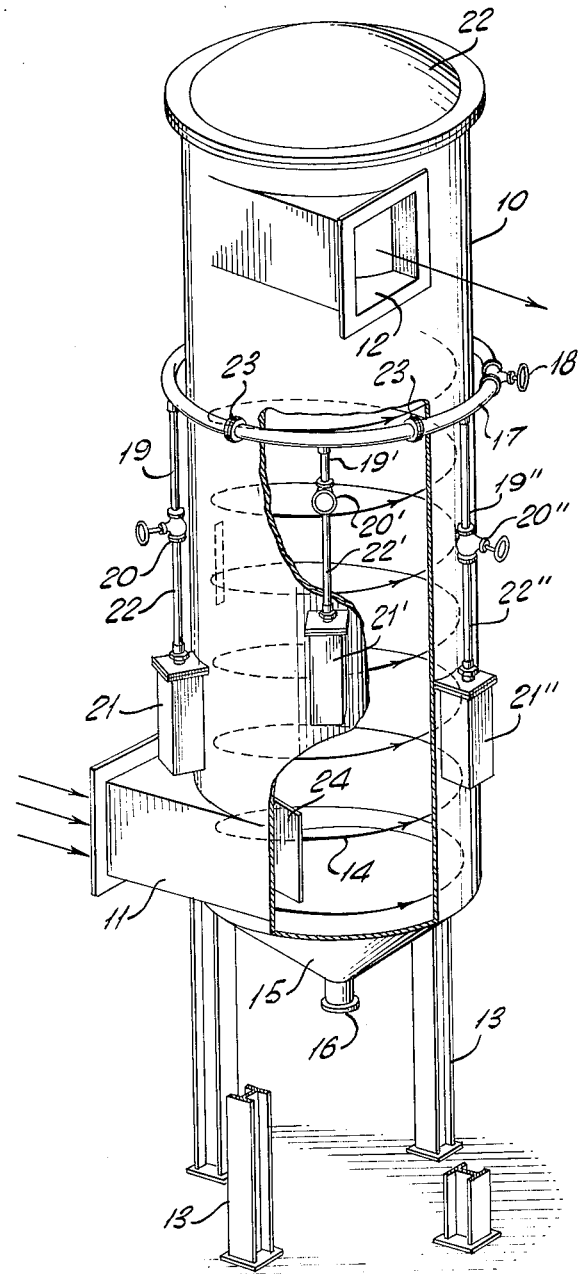

Feb. 8, 1966   R. R. CALACETO   3,233,882
CYCLONIC GAS SCRUBBER
Filed March 4, 1963   4 Sheets-Sheet 1

INVENTOR.
RALPH R. CALACETO
BY Blum, Moscovitz,
Friedman, Blum & Kaplan
ATTORNEYS Feb. 8, 1966   R. R. CALACETO   3,233,882
CYCLONIC GAS SCRUBBER
Filed March 4, 1963   4 Sheets-Sheet 2
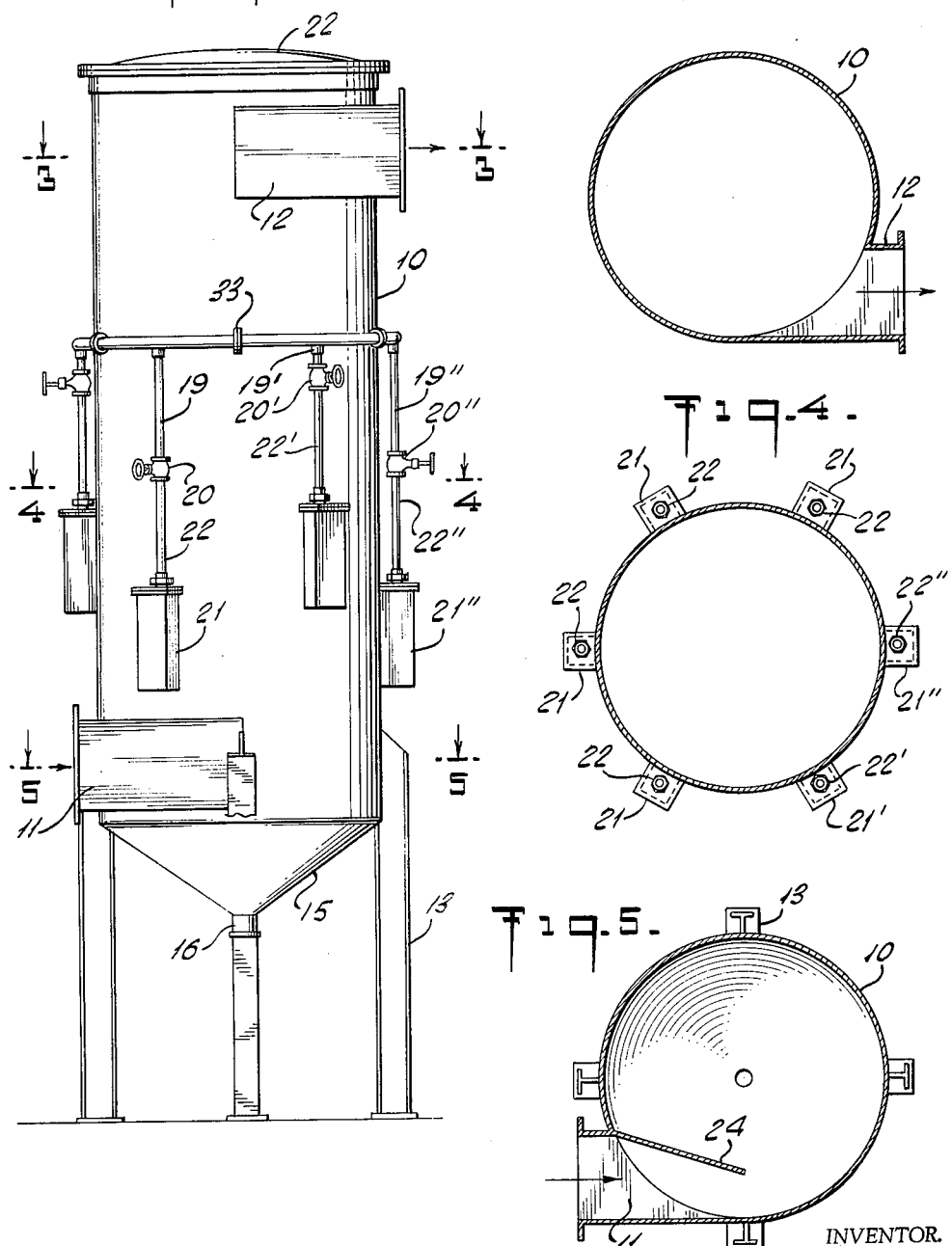
INVENTOR.
RALPH R. CALACETO
BY Blum, Moscovitz,
Friedman, Blum & Kaplan
ATTORNEYS Feb. 8, 1966 R. R. CALACETO 3,233,882
CYCLONIC GAS SCRUBBER
Filed March 4, 1963 4 Sheets-Sheet 3
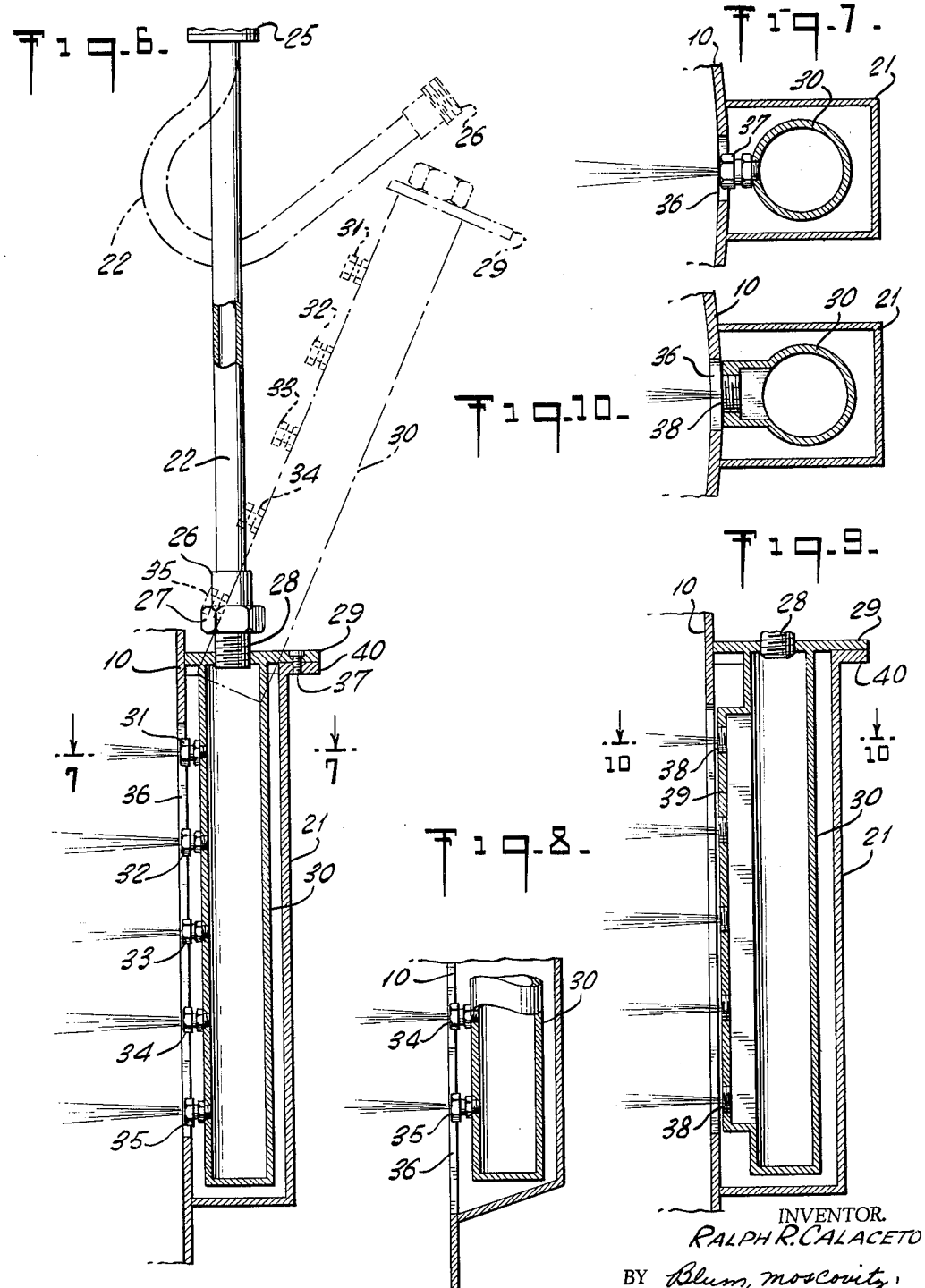
INVENTOR.
RALPH R. CALACETO
BY Blum, Moscovitz,
Friedman, Blum & Kaplan
ATTORNEYS Feb. 8, 1966  R. R. CALACETO  3,233,882
CYCLONIC GAS SCRUBBER
Filed March 4, 1963  4 Sheets-Sheet 4

INVENTOR.
RALPH R. CALACETO
BY Blum Moscovitz,
Friedman, Blum & Kaplan
ATTORNEYS United States Patent Office 3,233,882
Patented Feb. 8, 1966

3,233,882
CYCLONIC GAS SCRUBBER
Ralph R. Calaceto, Ridgewood, N.J., assignor to Airetron Engineering Corporation, Ridgewood, N.J., a corporation of New Jersey
Filed Mar. 4, 1963, Ser. No. 262,510
5 Claims. (Cl. 261—118)

The present invention deals with means for treating gases and more particularly for contacting said gases with liquid to separate particles carried by said gases, or otherwise effect an inter-reaction between said gas and liquid phases.

In a very large number of processes, it is necessary to contact a gas stream with a liquid stream. This can be done to merely remove entrained particles contained in the gas stream, or to effect an inter-reaction between the gas and the liquid. As to the latter, for example, readily soluble gases such as hydrogen chloride, or ammonia may be contacted with water so as to dissolve the former in the latter. Alternatively such contacting may be in the nature of a reaction zone wherein certain materials are stripped from the gas stream or neutralized. An example of this type of use would be the neutralization of sulfur dioxide or hydrogen sulfide by the use of an alkaline solution. Another example where such gas-liquid contacting means are employed would be in the scrubbing of the overhead gases of a petroleum refining process with oil so as to remove entrained catalyst or other particles therefrom.

Conventionally, in such processes liquids are introduced within the tower shell as jets, the gases serving to contact the liquid jets and thus effect the desired inter-reaction. However, considerable problems have been encountered in terms of maintaining the apparatus and providing for cleaning and replacement of parts. Often the jet nozzles, etc., tend to clog or corrode and require replacement. In conventional designs this requires a great deal of effort, e.g., tearing down each of the jets plus their piping connections, etc. Similarly, a relatively complex initial installation is required in fixing each of the jets to the tower shell.

In accordance with the present invention, means are taught for contacting gases and liquids by the use of a plurality of liquid introduction jets which are characterized by their ease of installation and maintenance, as well as their ability to be removed from the tower structure with a minimum of dislocation of the other equipment. More specifically, in accordance with the present invention, discharge manifolds are positioned about the shell of the gas-liquid contacting tower. Each of the manifolds contain a plurality of vertically spaced jets. When the manifold is in place the jets are in alignment with openings in the tower shell so as to be able to introduce liquid therein. The discharge manifold is non-permanently fixed to the tower shell, and is conveniently supported within a housing affixed to the tower. A central liquid supply manifold is preferably used to supply all the various jet-containing manifolds. In a highly preferred embodiment, at least a portion of the conduits connecting the central supply manifold with the various jet manifolds is a flexible conduit such as made of flexible metal piping, or rubber hose. Additionally, it is preferred to have the bottom wall of the tower downwardly converging so as to facilitate drainage of liquid from the tower chamber.

As will be made more clearly apparent from the following description and accompanying examples, the jet nozzle discharge arrangement provides for ease of installation and maintenance and the entire jet manifold assembly can be removed as a sub-assembly component without disrupting the other apparatus elements employed. The flexible length of pipe provides some extra length so that the entire jet assembly can be removed without requiring the removal of the rigid pipes disposed about the gas-liquid contacting tower.

Figure 11:
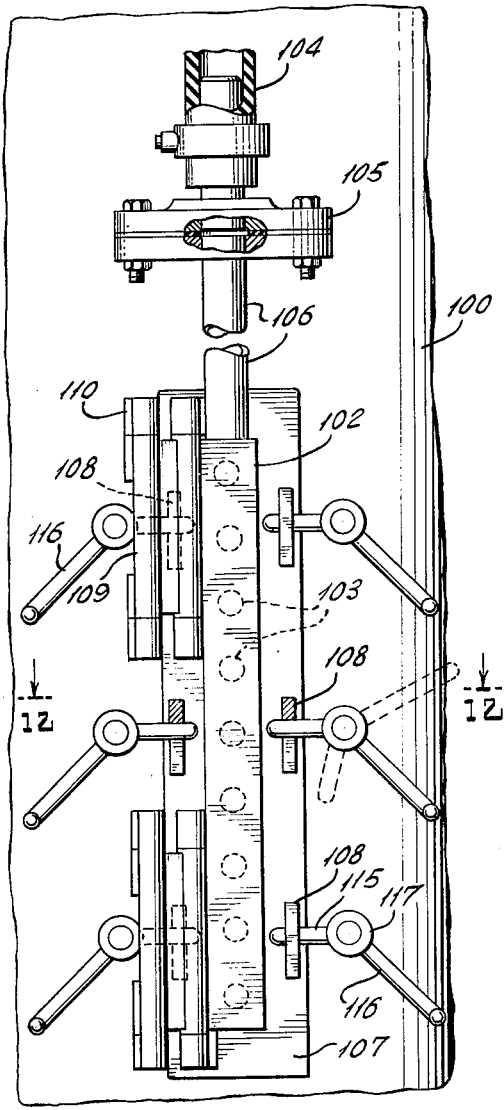
Figure 12:
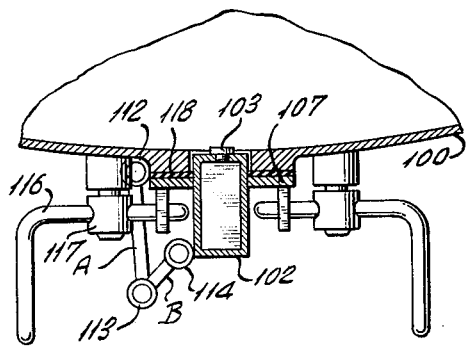
Figure 13:
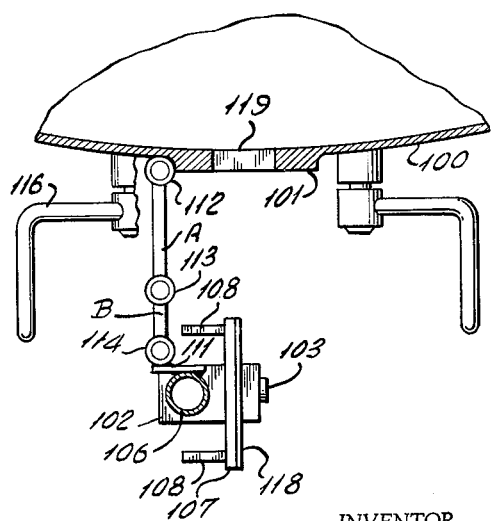
Figure 14:
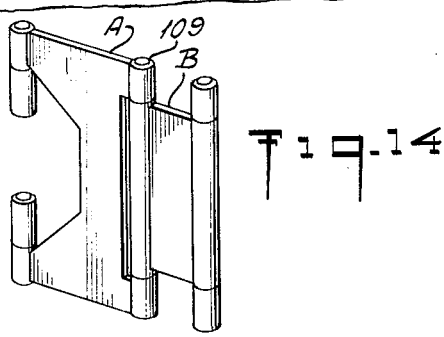

In the drawings:
FIGURE 1 is a part sectional elevation of an apparatus employing the present invention.
FIGURE 2 is a side view of the apparatus of FIGURE 1.
FIGURE 3 is a sectional view taken along the line 3—3 of FIGURE 2.
FIGURE 4 is a sectional view taken along the line 4—4 in FIGURE 2.
FIGURE 5 is a sectional view taken along the line 5—5 of FIGURE 2.
FIGURE 6 is an enlarged view of the manifold assembly and connecting flexible conduit.
FIGURE 7 is a sectional view taken along the line 7—7 of FIGURE 6.
FIGURE 8 illustrates one portion of the jet assembly manifold.
FIGURE 9 illustrates an alternative configuration of the jet discharge manifold.
FIGURE 10 is a sectional view taken along the line 10—10 of FIGURE 9.
FIGURE 11 is an elevational view of an apparatus employing a manifold placement structure which may be readily rotated away from the wall of the vessel without necessitating removal of bolts, etc.
FIGURE 12 is a sectional view taken along the line 12—12 of FIGURE 11 and showing the manifold when in place.
FIGURE 13 is a sectional view taken along the line 12—12 of FIGURE 11 illustrating ready rotation of the manifold from its normal position for servicing.
FIGURE 14 illustrates the double hinge placement structure employed in the apparatus shown in FIGURES 11 through 13.

As indicated previously, the present invention can be employed in a wide variety of process steps involving gas-liquid contact. Examples thereof are the following:

Removal of fine particles in gaseous discharge from lime kilns, asphalt plants, incinerators, cement kilns; neutralization of acidic components in a gas stream, e.g., sulfur dioxide, hydrogen sulfide, organic sulfide components by the use of an alkaline solution introduced as a jet spray; alternative neutralization of basic components with acidic materials; absorption of relatively soluble gases such as hydrogen chloride and ammonia by contact with aqueous solutions, etc.

Referring to the drawings, the apparatus shown therein will be described by way of illustration, rather than limitation with respect to its use to remove fine particles from a gas stream. In such use, particles of 1 micron or larger in size have been removed from the gas stream with an efficiency of 98 to 99 percent. In the present example, flue gas is scrubbed with water so as to remove fly ash contained therein. The flue gas is introduced at a rate of about 1000 cubic feet per minute into tower 10 by means of inlet 11, with approximately 4 gallons of water per minute being introduced overall by the jet assemblies which will further be described.

Tower 10 may essentially be a relatively conventional gas-liquid contacting tower. It is preferred to introduce the gaseous stream to be treated in a tangential manner so as to impart a swirling or spinning velocity to the gas as it rises in the treating chamber. Liquid is sprayed into the swirling gas stream by the plurality of jet manifolds. The treated gas stream is withdrawn overhead via outlet 12. By having the gas move in a spinning or swirling motion, improved contacting efficiency is realized. Toward this end a diverting surface 24 may be positioned about the point of introduction of the gas stream into the tower as a means of promoting the spinning velocity of the liquid droplets and gas admixture. As shown in the drawing, the diverting surface may take the form of a plate annularly positioned with respect to inlet 11. The swirling action of the gas as it makes its way up the contacting tower is indicated by lines 14. Tower 10 may have a conventional top enclosure 22. It is preferable that the lower portion of the tower have a downwardly converging structure which is shown as conical section 15 in the drawing. As the liquid flows down the walls of the contacting tower, the use of the downwardly converging section promotes drainage of liquid (liquid-containing solid particles in the present example) into discharge drain 16. Tower 10 is normally supported above the ground by means of conventional supporting members 13.

In accordance with the present invention, positioned about the shell of the gas-liquid containing tower 10 are a plurality of jet discharge manifolds indicated by the numbers 21 in the drawings. Like members are shown in the drawing by the use of like numbers. The jet manifold assembly which is shown in greater detail in FIGURES 6 through 10 is positioned at varying elevations about the circumference of the tower shell. Each of the jet manifolds 21 contain a plurality of essentially vertically spaced jet discharge ports which are in alignment with openings in the tower shell 10, thus permitting liquid to be introduced from the manifold into the tower at a plurality of points. The jet ports need not be in perfect vertical alignment, e.g., they can be at an angle relative to each other, but are positioned so that when in place they are at different elevations along the vessel wall, and the term "essentially vertically spaced" denotes this characteristic.

The jet assembly is employed preferably in conjunction with a central manifold 17 which supplies liquid to each of the jet assemblies. The manifold may comprise a plurality of pipe sections surrounding tower shell 10 which are bound to each other by means of flanges 23 or other means. The manifold 17 is connected to a source of the desired liquid by means not shown, valve 18 being employed to control the rate of flow of the liquid into the manifold 17. Manifold 17 is connected to the jet assemblies by means of conduits or pipes 19 and 22, it normally being preferred to place a valve or other flow control means 20 in the line so as to adjust the relative amounts of liquid going to each of the spray jet assemblies.

As shown particularly in FIGURE 6, at least a portion of the conduit connecting the central manifold to the jet assembly comprises flexible tubing. The flexible tubing which is readily disconnected from the jet assembly manifold by means of fitting 26 permits the manifold to be readily withdrawn from its position without necessitating the removal or disconnection of the various rigid elements e.g., pipes, valves, etc., composing the overall assembly for supplying the liquid to the tower. In the present example the flexible tubing is a rubber hose (such as neoprene) althought it is to be understood that it can be flexible steel piping, etc. Connecting element 25 joins the flexible tubing to the valve and conduit assembly. While the drawing illustrates the use of flexible piping below valves 20, it can, of course, be employed at other portions of the overall conduit means connecting the central manifold to the jet assembly.

With particular reference to FIGURES 6 through 10, there is shown in detail the means for readily fixing and removing jet assembly 30 from the circumference of contacting vessel shell 10.

The jet manifold assembly may take the form of an elongated pipe or conduit having a liquid discharge means in the form of vertically spaced jets.

As shown in the drawings, jets 31 through 35 are positioned along the vertical length of jet assembly 30. The jet openings are in alignment with one or more openings 36 in shell 10 of the contacting tower. Jet outlets 31 through 35 may take any of a wide variety of forms, typical examples of which are shown in FIGURES 7 and 10. In one embodiment they take the form of a tapered aperture in the wall of the jet assembly. In another form they may be separate nozzles 37 and/or 38 which are attached to the opening in the wall of the assembly. Typical configurations suitable for the jet ports are as follows:

(a) The jet outlet may be positioned on the jet assembly so that the actual spray will be at about 90 degrees to the plane of the swirling gas.

(b) The outlets of the jet ports are positioned at an angle so that the liquid spray leads the gas swirl. In this manner, the liquid droplets have a shorter exposure time during the swirling action.

(c) The jets are constructed so that the spray angles into the gas swirl. In this manner the liquid droplets must turn in a pattern which extends their exposure time during the swirling action.

Jet assembly 30 is removably positioned about shell 10. Thus in the event the jet ports or other portions thereof wear out, plug, or otherwise require maintenance, the jet assembly may readily be withdrawn from its normal position. A particularly advantageous means for positioning the jet assembly with respect to the vessel shell is shown in FIGURES 6 and 9. A fixed housing 21 may be positioned about the walls of the contacting vessel. The jet assembly is merely inserted in the fixed housing so that its jet openings align with openings in the wall of the vessel. Conveniently the assembly is fixed in position by means of flange 29 which is supported on base 40. A bolt 37 or other device can be employed for holding the configuration in place. The conduit through which liquid flows to the jet assembly is readily fixed thereto by means of conventional fittings 26, 27 and 28. Thus, as shown in FIGURE 6, by uncoupling hose 22 from the jet assembly and merely moving it in place (the hose being flexible) the jet assembly can be removed from its normal position simply by unbolting one or more bolts 37 and withdrawing it from holder 21.

With reference to FIGURE 10, shown therein is an alternative form for the jet assembly and vertically spaced jets, the latter taking the form of openings in the wall 39 of the jet assembly which faces the reactor vessel. Jet openings 38 are in alignment with the openings through the wall of the vessel 10 so as to enable the liquid to be readily discharged thereto.

A particularly preferred modification of the present invention is illustrated in FIGURES 11 through 14. This aspect of the present invention is characterized by the extreme ease of placing the manifold system in alignment with the openings in the vessel wall, as well as the ease of removing the manifold from its normal position and subjecting it to servicing. More specifically, in this embodiment a double hinge placement structure which fixes the manifold to the wall of the reaction vessel cooperates with a cam closing lever, the lever when in closed position fixing the manifold snugly to the wall of the vessel as is shown in FIGURE 12. When the lever is in open position the double hinge placement structure allows the manifold to be swung free of the vessel wall and readily serviced as shown in FIGURE 13.

More particularly describing this aspect, FIGURE 11 illustrates the manifold in fixed position against the wall of vessel 100. Manifold 102 is essentially the same as that shown in the previous figures as containing a plurality of jet ports 103 which are placed in alignment with openings 119 in the walls of the vessel. Manifold 102 is distinguished from that shown in the previous figures in that there is no external housing (housing 21) surrounding the manifold structure itself. This is not necessary in view of the manner in which the manifold is fixed to the vessel wall. As in the previous drawings a rubber hose 104 may lead from a central supply manifold not shown. The hose is fixed to the jet assembly 102 by means of flange coupling device 105 and pipe 106. When it is desired to remove manifold 102 from its normal placement, the rubber hose 104 would first normally be disconnected and simply swung away as was shown in FIGURE 6.

Multi-, e.g., doubly hinged placement structure 109 serves to connect jet manifold assembly 102 to the walls of vessel 100. The doubly hinged structure which is shown particularly in FIGURE 14 consists of two segments A and B which swing about pivots 112, 113 and 114, so as to enable the placement structure to take the configuration illustrated in FIGURE 12 (when the manifold is in fixed position) or that illustrated in FIGURE 13 (when the manifold is swung away from the wall of the vessel). It is necessary that the placement structure be multi-hinged (able to swing in a plurality of arcs) in order to allow the manifold to be swung away from its normal position, a single hinged structure not permitting manifold flange 107 etc., to be swung clear of the various structures employed in fixing the manifold to the wall of the vessel.

Double hinged placement structure 109 may be bonded to vessel 100 at positions 110 by a variety of means. Normally it is bolted to the vessel wall by means not shown. Alternatively it can be fixed by welding the non-movable portion of the hinge to vessel 100.

With reference to describing how the manifold is put into position, initially handle 116 of cam closing device 115 is put into the position shown by the dotted lines in FIGURE 11. The jet manifold 102 which is fixed to double hinged placement structure 109 at 111 by means of welding, soldering or bolting is in the position shown in FIGURE 13. The manifold assembly 102 is characterized by a manifold flange 107 which is adapted to fit the vessel wall flange 101 surroundng opening 119. Normally it is desirable to put a sealing element 118 between metal flange 107 and the metal wall flange 101, seal 118 normally being made of rubber, asbestos or fabric. Affixed to the end portions of manifold flange 107 is locking element 108 which is adapted to receive the cam closing lever 115 when handle 116 is actuated into a closed position. The position shown in FIGURE 13 is substantially that assumed by the manifold prior to initial placement, as well as that which it takes upon periodic removal from its vessel wall placement for cleaning repairs, etc.

Thereafter, segments A and B of the double hinged placement structure are swung about pivots 112, 113 and 114 so as to position manifold 102 as shown in FIGURE 12, jet port 103 being in alignment with opening 119 in the walls of vessel 100. Similarly flange 107, seal 118 and vessel flange 101 are in alignment so as to permit a relatively close fit. Thereafter, cam closing handle 116 is moved about pivot 117 so as to force cam closing lever 115 into snugly fitting position under locking element 108. The cam closing lever 115 in cooperation with locking element 108 thus fixes manifold 102 in place as is shown in FIGURE 12.

The cam closing lever 115 upon fitting into locking element 108 subjects the element to horizontal movement since the element has a slightly inclined shape. As lever 115 pivots deeply into element 108 the inclined shape effects a tight closure when 107 inturn depresses seal 118.

When it is desired to remove the manifold from its fixed position as shown in FIGURE 12, the above procedure is merely reversed, i.e., cam closing lever 115 is removed from its locked position relative to element 108 by swinging handle 116 about pivot 117 so as to assume its position shown by the dotted lines in FIGURE 11. Thereafter, the double hinged placement structure 109 is swung about its several pivots so as to swing the manifold 102 away from the walls of the vessel into position substantially as shown in FIGURE 13. Thereafter, the manifold can be readily cleaned, repaired and otherwise worked upon since it is well removed from the walls of the vessel and amenable to be worked upon.

Various modifications may be made to the present invention. While FIGURES 1 to 10 illustrate the use of a relatively permanently fixed housing for enclosing the removable jet assembly, the housing itself may be fixed in removable fashion to the walls of the shell. Numerous means for fixing the jet assembly within the housing so as to insure a proper fit, etc., will suggest themselves to those skilled in the art.

Having described the present invention, that which is sought to be protected is set forth in the following claims.

I claim:
1. In a tower wherein a gas is contacted with a liquid which is injected into said tower, the improved apparatus which comprises liquid introduction means positioned about the shell of said tower for introducing liquid thereto as jets,
   said liquid introduction means comprising a plurality of essentially vertically spaced jets supported on a discharge manifold positioned about said tower shell, said jets when in normal position being in alignment with openings, in said tower shell so as to be able to introduce liquid therein,
   a multiply hinged connecting arm connecting said discharge manifold to said tower shell, said arm permitting said discharge manifold to be readily swung away from its normal position in proximity to said tower shell and in alignment with openings therein,
   and means for locking said manifold in place when swung into alignment with the openings of said vessel.

2. The apparatus of claim 1 wherein said means for locking the manifold in place comprise locking elements fixed to said manifold structure and adapted to receive a cam closing lever, a cam closing lever affixed to said tower shell, said cam closing lever being fixed within said locking means when locking said manifold in position against said tower shell.

3. In a tower wherein a gas is contacted with a liquid which is injected into said tower, the improved apparatus which comprises liquid introduction means positioned about the shell of said tower for introducing liquid thereto as jets,
   said liquid introduction means comprising a plurality of essentially vertically spaced jets supported on a discharge manifold positioned about said tower shell, said jets when in normal position being in alignment with openings in said tower shell so as to be able to introduce liquid therein,
   a multiply hinged connecting arm connecting said discharge manifold to said tower shell, said arm permitting said discharge manifold to be readily swung away from its normal position in proximity to said tower shell and in alignment with openings therein,
   said manifold structure comprising a plurality of vertically spaced jet ports so as to permit introduction of liquid jets at various elevations of said tower, said manifold having flange segments adapted to fit snugly against said tower shell in the area of said openings in the tower shell, said flange segments having a plurality of extensions adapted to receive a cam closing lever when said manifold is fixed in position against said tower shell,
   a manifold locking structure fixed to the tower shell in the area surrounding the position of said manifold when fixed in place, said closing structure comprising a cam closing lever which is actuated by the rotation of a handle about a pivot, the rotation of said handle about said pivot causing said closing lever to be snugly positioned under said receiving extensions of said jet manifold and to thus maintain said manifold in place, the counter revolution of said handle removing said cam closing lever from its position and thus allowing said manifold to be withdrawn from its position against said tower shell by means of said doubly hinged connecting arm.

4. In apparatus for contacting a gas with a liquid, a tower having a gas inlet for introducing gas under pressure for contact with a liquid, said tower having a wall formed with a liquid inlet opening extending therethrough, a manifold housing secured on said wall and enclosing said opening, a pipe assembly carrying a plurality of spaced laterally extending liquid discharge ports aligned with said opening for directing liquid in spaced jets from the interior of said pipe through said opening and into said tower for contacting gas therein, said pipe assembly being removably fixed in said housing in peripherally spaced relation therewith, conduit means communicating with said pipe assembly for supplying to the interior thereof liquid to be discharged from said assembly through said ports and through said opening of said tower into the interior thereof, and means for removably fixing said assembly in said housing with said ports in alignment with said opening whereby said assembly may be separately removed as a unit from said housing and the wall of said tower for servicing and inspection while the tower is under gas pressure, said housing having a wall laterally spaced from said opening and at least coextensive therewith, said pipe being received between said tower and housing walls when fixed in said housing and said housing wall minimizing gas escape from said tower during pipe assembly removal as aforesaid, said conduit means including a length of flexible tubing adjacent said pipe assembly for facilitating removal of the latter from said housing.

5. In apparatus for contacting a gas with a liquid, a tower having a gas inlet for introducing gas under pressure for contact with a liquid, said tower having a wall formed with a liquid inlet opening extending therethrough, a manifold housing secured on said wall and enclosing said opening, a pipe assembly carrying a plurality of spaced laterally extending liquid discharge ports aligned with said opening for directing liquid in spaced jets from the interior of said pipe through said opening and into said tower for contacting gas therein, said pipe assembly being removably fixed in said housing in peripherally spaced relation therewith, conduit means communicating with said pipe assembly for supplying to the interior thereof liquid to be discharged from said assembly through said ports and through said opening of said tower into the interior thereof, and means including a flange connection for removably fixing said assembly in said housing with said ports in alignment with said opening whereby said assembly may be separately removed as a unit from said housing and the wall of said tower for servicing and inspection while the tower is under gas pressure, means at said flange connection for securing said assembly in said housing, the latter having a wall laterally spaced from said opening and at least coextensive therewith, said pipe assembly being received between said tower and housing walls when fixed in said housing and said housing wall minimizing gas escape from said tower during pipe assembly removal as aforesaid.

References Cited by the Examiner

UNITED STATES PATENTS

| | | | |
|---|---|---|---|
| 892,514 | 7/1908 | Fuller | 16—163 |
| 1,940,197 | 12/1933 | Wagner | 55—457 |
| 2,242,424 | 5/1941 | Fisher. | |
| 2,509,817 | 5/1950 | Foreman | 55—236 |
| 2,604,185 | 7/1952 | Johnstone et al. | 261—118 XR |
| 2,750,169 | 6/1956 | Joyce | 158—2 |
| 2,941,236 | 6/1960 | Monroe et al. | 16—163 |
| 2,964,304 | 12/1960 | Rice | 55—220 |

FOREIGN PATENTS

| | | |
|---|---|---|
| 827,569 | 1/1938 | France. |
| 179,626 | 12/1906 | Germany. |
| 471,331 | 3/1936 | Great Britain. |
| 809,378 | 8/1956 | Great Britain. |
| 351,579 | 3/1961 | Switzerland. |

HARRY B. THORNTON, *Primary Examiner.*